United States Patent
Faitelson et al.

(10) Patent No.: US 9,063,797 B2
(45) Date of Patent: Jun. 23, 2015

(54) METHOD AND APPARATUS FOR EVENTS HANDLING IN A MULTI-PLATFORM SYSTEM

(75) Inventors: Yakov Faitelson, Elkana (IL); Ohad Korkus, Herzeliya (IL); Ophir Kretzer-Katzir, Reut (IL)

(73) Assignee: VARONIS SYSTEMS, INC. NY (US)

( * ) Notice: Subject to any disclaimer, the term of this patent is extended or adjusted under 35 U.S.C. 154(b) by 39 days.

(21) Appl. No.: 13/235,526

(22) Filed: Sep. 19, 2011

(65) Prior Publication Data

US 2013/0074100 A1 Mar. 21, 2013

(51) Int. Cl.
G06F 3/00 (2006.01)
G06F 9/44 (2006.01)
G06F 9/46 (2006.01)
G06F 13/00 (2006.01)
G06F 9/54 (2006.01)

(52) U.S. Cl.
CPC .......................................... *G06F 9/54* (2013.01)

(58) Field of Classification Search
None
See application file for complete search history.

(56) References Cited

U.S. PATENT DOCUMENTS

| 5,829,023 | A | * | 10/1998 | Bishop | 711/118 |
| 7,865,887 | B2 | * | 1/2011 | Kaiser et al. | 717/161 |
| 8,127,358 | B1 | * | 2/2012 | Lee | 726/24 |
| 2004/0133577 | A1 | | 7/2004 | Miloushev | |
| 2005/0278708 | A1 | * | 12/2005 | Zhao et al. | 717/136 |

FOREIGN PATENT DOCUMENTS

WO 03-012578 A1 2/2003

* cited by examiner

*Primary Examiner* — H. S. Sough
*Assistant Examiner* — William C Wood
(74) *Attorney, Agent, or Firm* — Soroker-Agmon

(57) ABSTRACT

A method for event handling in a multi-platform system, comprising acquiring an event of a file access from the multi-platform system, processing the event taking account of an auxiliary data to decide an action and activating the action, and an apparatus for performing the same.

22 Claims, 3 Drawing Sheets

METHOD AND APPARATUS FOR EVENTS HANDLING IN A MULTI-PLATFORM SYSTEM

BACKGROUND

The present disclosure generally relates to file access events, and more specifically, to handling file access events in a multi-platform system.

Distributed multi-platform computerized systems are in common use. For example, in banking, investment houses, large corporations or others such as the military.

Such systems may include, for example, from tens of platforms to thousands of platforms, with a rate of millions or about a billion file accesses per hour.

SUMMARY

One exemplary embodiment of the disclosed subject matter is a system for event handling in a multi-platform system, comprising a process installed in platforms of the multi-platform system for intercepting events of file access in the multi-platform system, and an at least one server connected to an at least one platform, the at least one server configured for acquiring events intercepted by the process and for processing the events by an at least one rule for deciding an action responsive to the event while taking into account an auxiliary data that is provided separately from event acquisition Another exemplary embodiment of the disclosed subject matter is a method for event handling in a multi-platform system, comprising acquiring an event of a file access in the multi-platform system, processing the event taking account of an auxiliary data to decide or determine an action and optionally activating the action.

In the context of the present disclosure, without limiting, a platform implies a computer having data resources such as folders or files, possibly shared with another computer, wherein different platforms may be of different apparatus and/or software and possibly with different organization of the data objects or resources. For example, platforms may be different computer types running under different operating systems and using different file systems.

Generally a platform is connected to one or more other platforms forming various connection patterns, such as interconnected clusters of platforms where the clusters are linked therebetween.

In the context of the present disclosure, without limiting and unless otherwise specified, a server implies a computer additional or complementary to the multi-platform system.

In the context of the present disclosure, without limiting and unless otherwise specified, a database implies any data structure additional or complementary to the data resources or objects of the multi-platform system, not precluding a conventional database of the art nor lookup tables.

For brevity and clarity and without limiting, in the present disclosure a reference to an operating-system implies any software operative to control functions of a computer and particularly controlling access to the file-system, such as Windows, Linux, MacOS or others.

For brevity and clarity and without limiting, in the present disclosure a reference to a fife-system implies any repository or organization of data objects or data resources in a platform or shared among a plurality of platforms. For example, Microsoft's NTFS or FAT32, Apple's HFS, IBM's LTFS, Sun Microsystems's ZFS, Oracle's ACFS, Microsoft SharePoint, or any other organization such as emails in mail server as for example Microsoft's Exchange, or any other organization such as Joliet (ISO 9660:1988).

In the context of the present disclosure, without limiting, referring to a file implies any data object or data resource of a file-system, for example, attachment within an email or a link to a web page or an ordinary file as used in the art.

In the context of the present disclosure, without limiting, an event is referred to as used in the art of computers and software, such as an interrupt, a signal or a procedure call, generally asynchronous yet without precluding a synchronous event.

For brevity and clarity and without limiting, in the present disclosure a distributed multi-platform computerized system is referred to as a multi-platform system.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described.

Figure 1:
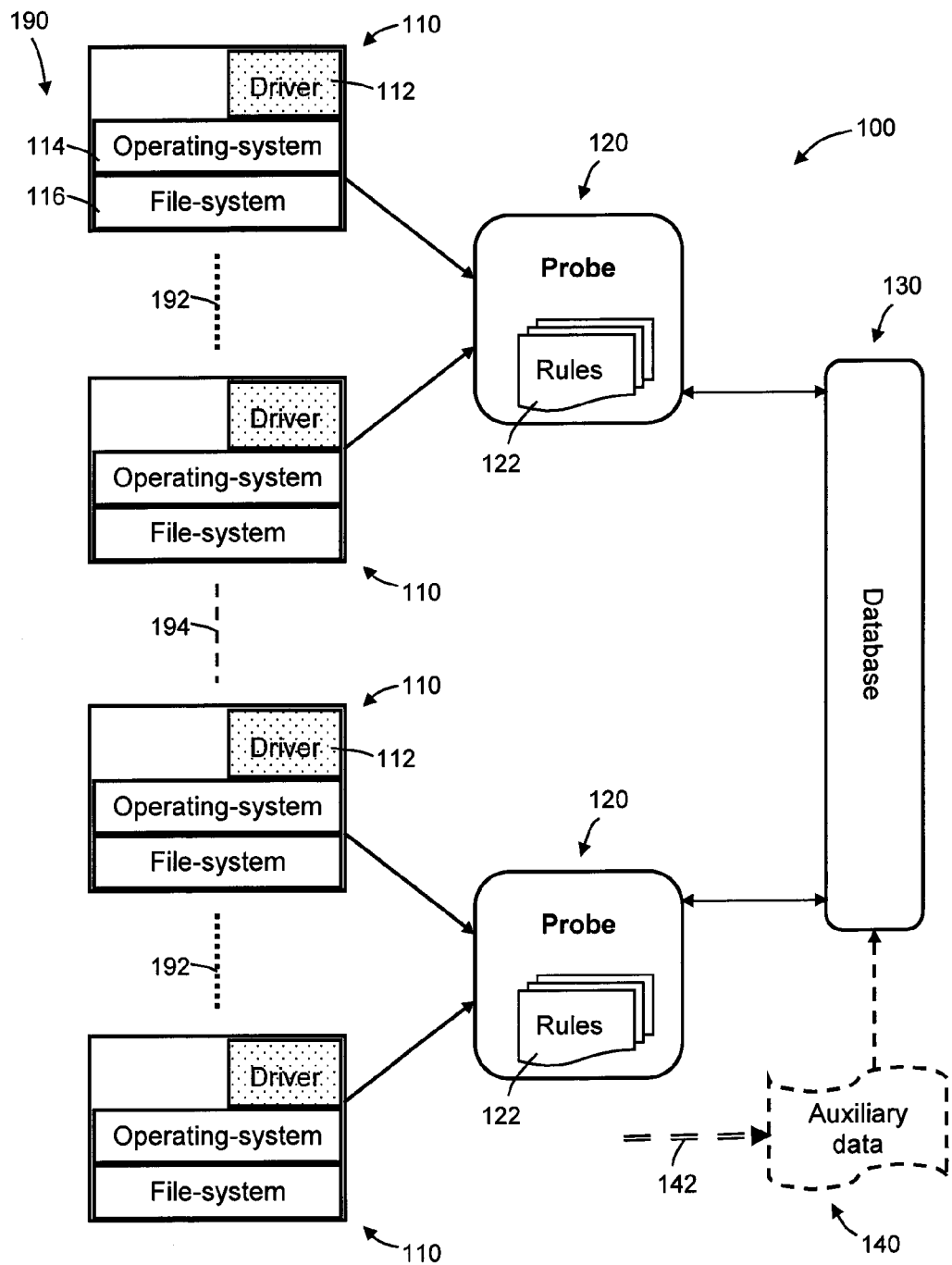

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 2:
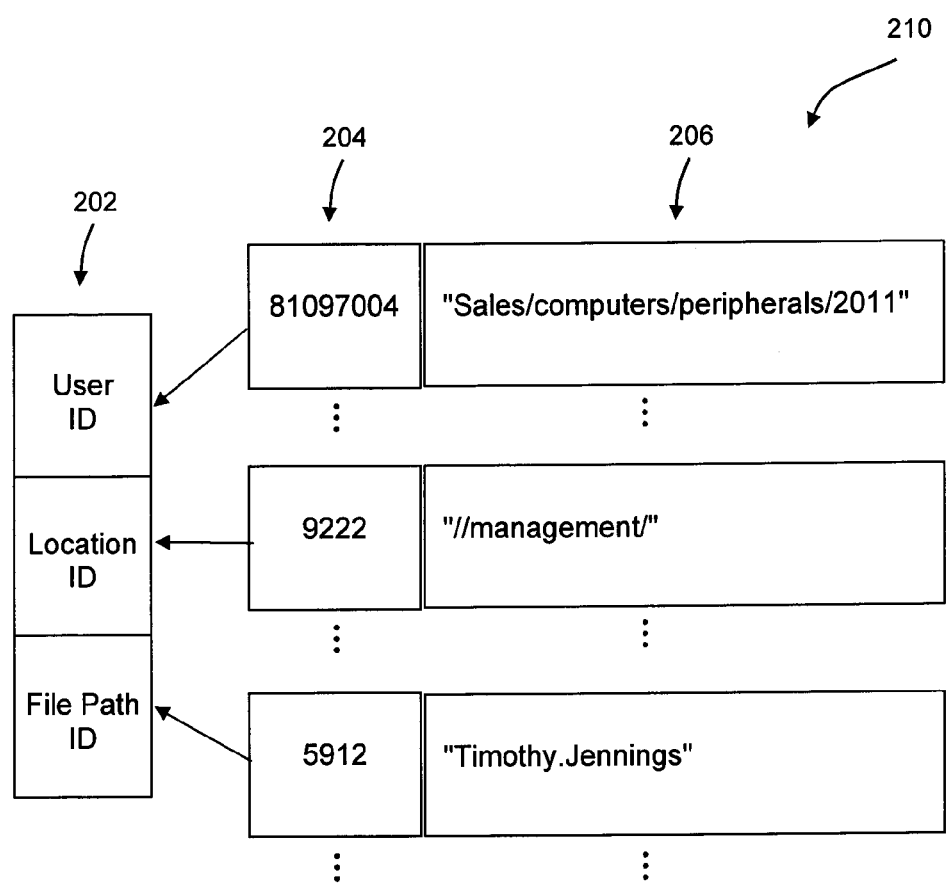
Figure 3:
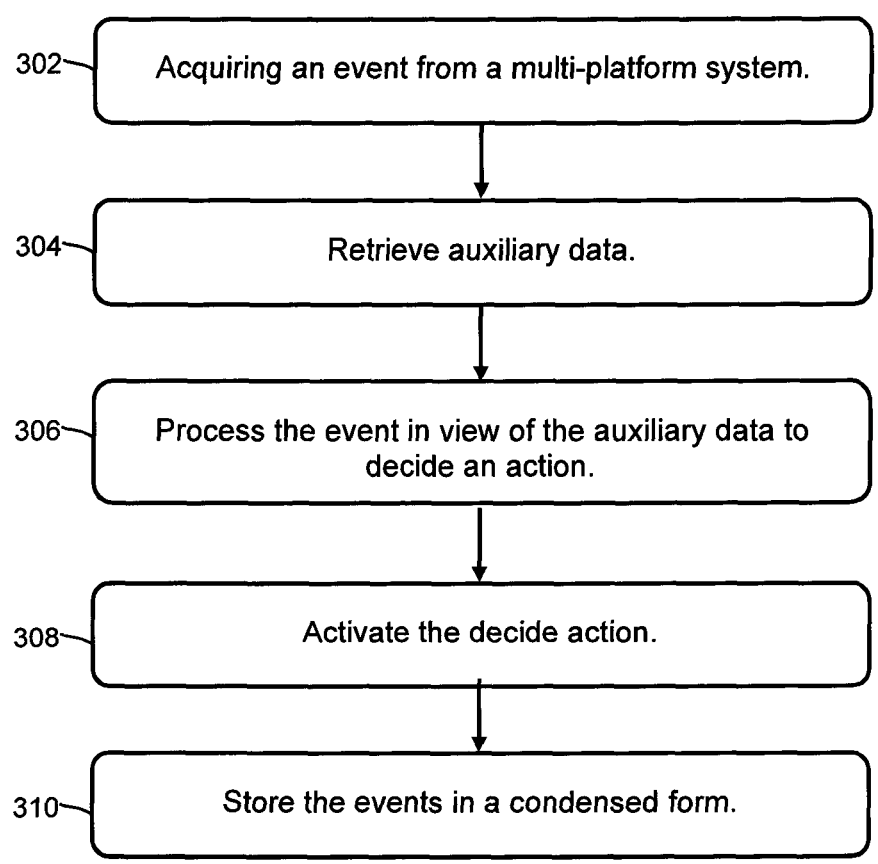

FIG. 1 schematically illustrates a system for event handling in a multi-platform system, according to exemplary embodiments of the disclosed subject matter;

FIG. 2 schematically illustrates normalized event record, according to exemplary embodiments of the disclosed subject matter; and FIG. 3 schematically outlines operations in handling events from a multi-platform system, according to exemplary embodiments of the disclosed subject matter.

DETAILED DESCRIPTION

One technical problem dealt by the disclosed subject matter is responding in real-time to intercepted file access events in a multi-platform system.

Another technical problem dealt by the disclosed subject matter is condensing and reducing the amount of data related to intercepted file access events in a multi-platform system.

Yet another technical problem dealt by the disclosed subject matter is handling intercepted file access events in a multi-platform system in or according to an extended or expansive context beyond the event per se.

One technical solution according to the disclosed subject matter is linking or coupling to each platform or a part thereof a process that intercepts file access events. Information of or related to events in one or in a group of platforms is monitored by a server, also referred to as a 'probe', connected to one platform or to each of the platforms in the group.

The information of the events is handled by the probe, thereby relieving the platform of the overload of processing the events information, thereby enabling to handle and respond in real-time to the events in the multi-platform system.

According to the load, or expected load, of handling the intercepted events in real-time, additional probes are connected to the platforms, reducing the burden on each probe and balancing the processing loads, thereby providing a scalable scheme for load balancing of responding to real-time events in a multi-platform system.

Another technical solution according to the disclosed subject matter is a process operating in the probes or in apparatus linked to the probes that, in conjunction with a data structure such as table or database, discard redundant data of intercepted events and/or abbreviate redundant data of intercepted events in a related code.

By way of example, if a user opened a particular object such as a file or a folder several times within a time interval, instead of recording each individual access only the time interval is recorded, possibly with the number of access within that interval.

By way of another example, an accessed object is assigned a unique code, thereby avoiding repeatedly recording the full path string of the object.

By way of yet another example, instead of recording a user name, an abbreviated unique code for that user name is used, thereby avoiding repeatedly recording the full name of that user.

Yet another technical solution according to the disclosed subject matter is one or more data structures, such as a database, stored in a server connected to the probes and/or in the probes, the one or more data structures holding auxiliary or extraneous or disjoint information with respect to the events.

Taking into account auxiliary information, the event may be handled and/or analyzed in a wider context of the multi-platform system or beyond.

By way of example, an object such as a folder may be noted in the data structure as being of sensitive data to the organization. When that object is accessed, an event is generated in a platform storing that object and the event is monitored or captured by a probe.

The data of the event that includes the object path, or code thereof, is checked with respect to the data in the data structure, and in case the object is recognized as sensitive further actions may be performed.

The data in the data structure may be predefined or may be determined or modified according to events or other operations in the multi-platform system. Thus, the auxiliary or extraneous information may be incrementally updated in the course of operation of the multi-platform system. For example, if a particular user is repeatedly accessing a particular file within a certain time, the information is updated to that effect in the data structure. Consecutively, upon further event of access to that file by that user, as captured by a probe, the information in the data structure is consulted and further access to that file may be prevented from that user.

A potential technical effect of the disclosed subject matter is a multi-platform system that handles in real-time file access events within an extended context beyond the data included in the events.

As used herein, the term real-time generally implies a sufficiently fast operation responsive to an event accomplished before another event occurs.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

Operations on a file of a file-system, such as a creation or deletion of a file or reading from or writing into a file, and in some cases modifying attributes of a file such as read-only, are generally well-defined procedures of an operating-system and/or a file-system. Such operations on a file may be tracked, for example, by services of the operating-system, or by using API (Application Programming Interface), or by 'hooking' onto the file operation procedure, or any other method offered by the operating-system and/or the file-system. Obtaining information on the occurrence and nature of a file operation is collectively referred to herein as 'file operation capturing', or, for brevity, as 'capturing', or variants thereof.

An event may be generated by capturing the file operation. In some cases, the operating-system and/or the file-system generate the events. In many cases and/or in some embodiments of the present disclosure, an event includes or is accompanied by or supplied with data, referred to as the event data. For clarity and brevity, the event data is also implied when an event is referred to.

The event data comprise items, or indications or references thereof, such as the accessed file with a partial of a full path, referred to as file path, the user who accessed the file, type of the event according to the performed operation such as open or delete, the time of the operations, referred to as a time stamp, the location or platform where the event originated, or any other data associated with the event such as the destination of the event in case of copying or moving, or any combination thereof.

In some embodiments, a platform comprises or is linked to or is coupled with a process that captures the file operations and generates events, or, alternatively, the process intercepts events generated by the operating-system and/or file-system. The process is also referred to herein as a 'driver'.

The events are acquired from one or more drivers by a server that operates as an agent for the multi-platform system with regard to events, the server or agent are also referred to herein as a 'probe'. In some embodiments, the probe inquires a driver of events, or, alternatively, the driver sends events to the probe. Optionally or alternatively, a combination of inquiry and receiving of events by the probe is used.

In some embodiments, probe may be connected to one platform or to a plurality of platforms. In some embodiments, a plurality of probes is used, each probe connected to a different plurality of platforms, optionally with connections redundancy.

In some embodiments, the probe stores the event data in a database according to a storage regime, such as responsive to events, or periodically such as once an hour or a day. In some embodiments, all the probes are connected to the same database. Optionally or alternatively, a plurality of databases is used, optionally accessible by all the probes.

In some embodiments, the database comprises information about the files or other information regarding the multi-platform system or any other auxiliary or disjoint information with respect to the events. Optionally, the database is supplied with information gathered during the operation of the multi-platform system and/or by the probe. For example, file permissions, classifications of the files such as sensitivity of groups, or identity of users who accessed certain files and in what rate or within what time interval, or removal or introductions of users to the multi-platform system.

Upon acquiring an event the probe checks the event data, possibly also with respect to the data in the database, and performs one or more operations according to one or more rules, resembling, to a limited extent, mailbox rules of email clients of the art.

For example, a rule may read like: if a deleted file is marked as sensitive, then generate an alert; consequently, suspending the operation unless acknowledged by an authorized user.

It is noted that using a driver and further processing events by a probe enables, at least potentially, minimal or negligible intervention in the operation of the multi-platform system.

FIG. 1 schematically illustrates an event handling system 100 in a multi-platform system 190, according to exemplary embodiments of the disclosed subject matter, wherein the arrows between the components of event handling system 100 generally indicate data flow between the components.

Multi-platform system 190 comprises a plurality of instances of a platform 110, representing any number of platform 110, as indicated by broken lines 192 and 194.

Platform 110 comprises an operating-system 114 and a file-system 116, or to that effect, any structure and/or mechanism for holding, managing and accessing data objects.

The event handling system 100 comprises a server as a probe 120 connected to one or more platforms such as platform 110, representing any number of platform 110 connected to probe 120, as indicated by dotted lines 192. The illustrated two instances of probe 120 represent any number of probes, such as probe 120, connected to any number of platforms, such as platform 110, as indicated by a dashed line 194.

Probe 120 comprises or coupled with or linked to one or more rules, collectively referred to as rules 122. Rules 122 use events or event data, or part thereof, as parameters or arguments for logic or a procedure of rules 122, according to which an action is decided or determined Platform 110 comprises a process denoted as a driver 112 that generates and/or intercepts file access events in platform 110, generally and without limiting referred to as 'intercepting'. The events are provided to and/or acquired by probe 120.

It is noted that driver 112 is not necessarily installed in or coupled with each platform 110 but, rather, driver 112 is installed in or coupled with any platform 110 having accessible files or for which file access events are being handled.

In some embodiments, responsive to obtaining an event, probe 120 executes the rules 122 using the obtained event as parameter for the procedural logic of rules 122. In case an action is decided by rules 122, probe 120 performs the action or invokes or initiates in or delegates the decided action to other components of event handling system 100 or multi-platform system 190.

In some embodiments, using probe 120 to process and handle events reduces processing load on multi-platform system 190 and/or minimizes or reduces intervention with the operation of multi-platform system 190 where driver 112 non-intrusively captures event of file access in multi-platform system 190.

In some embodiments, probe 120 obtains events from platform 110 via another component or components such as proxy servers that reduce communication load in event handling system 100 and/or reduce processing load by pre-processing such as filtering events before reaching probe 120.

In some embodiments, probe 120 stores the events in a database 130, enabling further reference and/or analysis thereof Optionally, probe 120 stores the events via a proxy such as a server and/or via intermediate storage such as a cache.

In some embodiments, database 130 is implemented on a server or any other apparatus, where database 130 represents any kind of storage repository or organization, possibly split or distributed in a plurality of servers or apparatuses. Thus, in some embodiments, events are stored in a structure or apparatus different or separate from where auxiliary data, further explained below, is stored. Yet, for brevity and clarity, either storage apparatus or structures are referred to as database 130.

In some embodiments, the events are stored using condensed forms and/or structures as described below.

It is noted that rules 122 are not necessarily stored in probe 120 and, alternatively or additionally, rules 122 may be stored in another apparatus such as a server linked to probe 120.

It is noted that driver 112 is not necessarily stored in platform 110 and, alternatively or additionally, driver 112 is stored in another apparatus such as a server linked to platform 110.

It is noted that probe 120 is not necessarily a separate apparatus from platform 110 and, alternatively or additionally, probe 120 is comprised in platform 110 such as using an additional processor and memory thereof.

In some embodiments, in addition to event data, rules 122 use additional information for deciding an action. The additional information, also referred to as auxiliary data, is used in conjunction with the event data or as reference, thereby affecting or enabling to affect the procedural course of the logic or procedures of rules 122 and/or the decided actions. In some embodiments, the auxiliary data is stored in database 130 and/or in any apparatus or structure represented by database 130.

In some embodiments, responsive to obtaining an event, probe 120 queries at database 130 for auxiliary data related to the event, and in case the auxiliary data is present in database 130, probe 120 retrieves the auxiliary data and incorporates the auxiliary data with rules 122. Optionally or alternatively, probe 120 retrieves, optionally repeatedly or periodically, auxiliary data from database 130 and stores data according to a regime such as according to frequency of repeated events. In some embodiments, probe 120 caches data, optionally keeping cached auxiliary data related to frequent events.

In some embodiments, the auxiliary data comprise information regarding files in the file-system of a platform or file-systems of a plurality of platforms.

For example, the auxiliary data may include permissions to access a file-system or part thereof, memberships in groups related to file-system or part thereof, classification of files or group of files, classified such a sensitive or public, tagging of files for any purpose or history or recommendations, designated owners of files or group thereof, or any other data such as sandbox results, that is 'what if' results, or a combination thereof.

In some embodiments, some or part of the auxiliary data is preset before the operation of multi-platform system 190 and/or event handling system 100.

In some embodiments, the auxiliary data or part thereof is provided from the operation of multi-platform system 190, as schematically illustrated by auxiliary data 140 and dashed arrow 142. For example, auditing or collecting history of activities of users with respect to files to generate permissions, or input by users.

In some embodiments, the auxiliary data or part thereof is provided by operations of event handling system 100, such as records of events and/or results of rules 122, provided from probe 120.

Accordingly, in some embodiments, database 130 is incrementally supplied or updated with auxiliary data during the operation of multi-platform system 190 and/or event handling system 100.

In some embodiments, auxiliary data related to an event comprises at least a part of data that is related to or associated with a file or group of files, such as a file name, or location of destination that belongs to or relates to or associated with the file.

It is emphasized that, in some embodiments, the events are stored in database 130 by probe 120 separately from the auxiliary data.

In some embodiments, probe 120 is connected to and communicates with database 130 via a proxy such as a server; optionally the proxy caches some of the events data from probe 120 and/or auxiliary data from database 130.

It is noted that using probe 120 at least potentially facilitates rapid response or real-time response to events since multi-platform system 190 is relieved from processing the events.

Having to respond to events and analyze and/or process the events, such as by rules 122, should in principle or theory involve repeatedly and seemingly redundant reference to and/or storage of items such as user-names, files paths, or location identifications such as IP or UNC paths.

Such redundant operations could adversely affect the response time and/or may necessitate additional processors, such as probe 120, in order to respond and process events in real-time.

Therefore and possibly for other reasons, in some embodiments, items of multi-platform system 190 or and optionally of event handling system 100 are expressed or coded in a short forms or codes. In some embodiments, only items that are repeatedly referenced and/or determined to be repeatedly referenced are coded. Coding items is also referred to herein as 'normalization' or a variant thereof.

The codes are stored in a structure or structures such as lookup tables, optionally using or assisted by mechanisms for sufficiently rapid retrieval, such as binary trees or hash tables.

Thus, in some embodiments, instead of acquiring and/or storing, or recording, event data with full user-name or full file paths of the accessed file or destination or locations UNC (Universal Naming Convention) and/or the like, only the respective codes are recorded, thereby saving operation times and also storage overhead such as in multiple access to a storage and generally saving storage space.

FIG. 2 schematically illustrates normalized event record, according to exemplary embodiments of the disclosed subject matter.

The lookup tables 210 comprise strings indicated as 206 for file path, location and user names, respectively, and associated with codes 204 as binary numbers, shown for clarity as decimal numbers. The codes are used to normalize an event record 202 using codes instead of the respective strings.

Furthermore and/or optionally or alternatively, in some embodiments, similar or redundant information is further reduced by condensing the information in a structure that reflects the repeated or similar information, an approach also referred to as aggregation.

For example, a file F accessed N times by a user U within between time T1 and time T2, is recorded only once as N accesses in time interval T1-T2. Moreover, file F and user U are optionally recorded by respective codes thereof rather than full paths and names strings.

As another example, accessing records R1, R2 and R3 in a database DB by a user U is not recorded three times but, rather, as DB and R1, R2, R3 and user U, with optional time interval, and optionally, DB and user U are recorded as the respective codes thereof.

In some embodiments, normalization data and structures are stored in database 130. Optionally or alternatively, normalization data and structures, or part thereof, is stored in auxiliary apparatus or storage, such as a proxy cache in probe 120 for rapid reference.

In some embodiments, the events are stored in aggregated forms in database 130 separately of the auxiliary data and/or in combination with or the auxiliary data or part thereof.

Using normalization and/or aggregation at least potentially reduces processing such as applying rules 122 and/or storage in database 130 and/or communication for acquiring the events from driver 112, thereby facilitating, at least potentially, to respond to and handle the events in real-time.

In some embodiments, the auxiliary data is also normalized in codes or formed in aggregations, further decreasing the response and/or processing of events, enabling to reduce the number of probe 120, at least potentially.

In some embodiments, rules 122 operate as 'if then else' construct. Optionally or additionally, rules 122 operate according to other constructs such as multi-branch or as inference machine.

In some embodiments, rules 122 stored in probe 120 are executed in parallel or multi-tasking or multi-threading, optionally processing a plurality of events are processed, at least partially, in parallel.

In some embodiments, rules 122 are arranged and/or operate according to one or more precedence criteria. For example, events from a user input are processed in precedence to events from a background database.

In some embodiments, the decisions and/or derived actions of rules 122 respective to an event are divided into three categories, namely, filter, alert and workflow, wherein the actions are optionally invoked or initiated in real-time responsive to an event or designed therefore.

In a filter action the events are dropped or ignored, thereby saving processing time and storage space. For example, events related to temporary or trivial files, or events related to backup operations.

In an alert action, a message and/or a signal is sent to an appropriate user and/or destinations, such as by an email or by storing in an event log. For example, announcing to a supervisor user when someone tries to access a sensitive file or when a user that is a member of a particular group tries to access files or a different group.

In a workflow action operation and/or operations are invoked or initiated. The operations may be user-defined or otherwise defined and/or based on a computerized or software engine that can be extended or modified such as by API's or other system calls. For example, blocking permission to a user that deletes multiple files within a determined or a preset time interval.

FIG. 3 schematically outlines operations in handling events from a multi-platform system, according to exemplary embodiments of the disclosed subject matter.

At 302 an event from a distributed multi-platform computerized system, such as multi-platform system, is acquired or received such as in probe 120, the event intercepted and/or generated from the multi-platform system by way of driver 112.

In some embodiments, the events, implying also data thereof, are acquired in a condensed form such as a normalized form by codes.

At 304 auxiliary data or additional data disjoint of the event is retrieved, such as from database 130 or from any source optionally from a cache.

At 306 the event is processes, such as by rules 122, in view of or by taking into account the auxiliary data, optionally determining on one or more actions.

At 308 the determined action is initiated or carried out, optionally by an apparatus such as probe 120 or by another apparatus optionally comprised in multi-platform system 190.

At 310, the events, in some embodiments implying also data thereof, is optionally stored such as in database 130, optionally in a condensed form by using codes and/or aggregations.

In some embodiments, storing is carried out before and/or after processing or activation of the action, optionally performed based on a periodic regime or responsive to an event of a plurality of events.

The operations and/or order of the operations outlined above may be modified. For example, the auxiliary data may have been stored or cached together with the processing codes, such as rules 122, so that no further retrieval of the auxiliary data is performed.

Two non-limiting examples with respect to a distributed multi-platform computerized system of a company, such as multi-platform system 190, as handled by event handling apparatus, such as event handling system 100, are described below.

In one scenario, the company receives information that one of the company's employees is about to leave the company. Asserting that the employee has access to sensitive information about the company, the administrator of the multi-platform system sets a rule, such as in rules 122, so that whenever the employee copies data that was flagged as sensitive, alert will is sent allowing spotting the employee and/or preventing copying the data by the employee.

In another scenario, in order to minimize the damage employees can cause to publicly shared data of the company, the administrator of the multi-platform system sets a rule, such as in rules 122, that if a user deleted more than three files within a minute on a folder that has permissions to 'everyone', this user's permissions will be removed, ensuring that the user will need to ask for access permissions afterwards.

It is noted that the techniques of the present disclosure is not limited to file access events but, in some embodiments, may be applied to other events or processes such as input-output events or communications between processes or apparatuses.

It is thus provided in accordance with the disclosed subject matter is a system for event handling in a multi-platform system, comprising a process installed in platforms of the multi-platform system for intercepting events of file access in the multi-platform system, and an at least one server connected to an at least one platform, the at least one server configured for acquiring events intercepted by the process and for processing the events by an at least one rule for deciding an action responsive to the event while taking into account an auxiliary data. In some embodiments, the auxiliary data is provided separately from acquisition of the events.

In some embodiments, the auxiliary data comprises at least one of: a preset data related to the multi-platform system, a data accumulated responsive to the operation of the multi-platform system, or an updated data responsive to the operation of the multi-platform system, or any combination thereof.

In some embodiments, the auxiliary data is stored in a database connected to the at least one server.

In some embodiments, the database is stored on an at least one apparatus separate from the at least one server and from the multi-platform system.

In some embodiments, the at least one server is configured to at least one of: acquire the events in a condensed form, process the events in a condensed form, store the events in a condensed form, or any combination thereof, thereby facilitating real-time response to the events.

In some embodiments, the condensed form comprises at least one of coded event data or aggregated event data, or a combination thereof.

In some embodiments, the at least one rule is stored in the at least one server, wherein, in some embodiments, the at least one server is configured to initiate an action decided by the at least one rule.

In some embodiments, the at least one rule comprises a plurality of rules.

In some embodiments, the at least one platform comprises a plurality of platforms.

In some embodiments, the at least one server comprises a plurality of platforms.

In some embodiments, the process is installed on each platform of the multi-platform system having accessible files.

It is thus further provided in accordance with the disclosed subject matter is a method for event handling in a multi-platform system, comprising acquiring an event of a file access from the multi-platform system, processing the event taking account of an auxiliary data to decide an action and activating the action.

In some embodiments, processing the event comprises using an at least one rule, wherein, in some embodiments, the at least one rule comprises a plurality of rules.

In some embodiments, the auxiliary data comprises at least one of: a preset data related to the multi-platform system, a data accumulated responsive to the operation of the multi-platform system, or an updated data responsive to the operation of the multi-platform system, or any combination thereof.

In some embodiments, acquiring an event is carried out on an at least server connected to and separate from the multi-platform system.

In some embodiments, the at least one server is configured to at least one of: acquire the events in a condensed form, process the events in a condensed form, store the events in a condensed form, or any combination thereof, thereby facilitating real-time response to the events.

In some embodiments, the condensed form comprises at least one of coded event data or aggregated event data, or a combination thereof.

In some embodiments, the auxiliary data is stored in a database connected to the at least one server.

The terms 'processor' or 'computer', or 'server' or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable to controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a similar one denotes an apparatus having one or more processors operable or operating according to a program.

The term configuring for a objective or a variation thereof implies using a software and/or electronic circuit designed and/or operable or operative to achieve the objective.

As used herein, without limiting, a module represents a part of a system such as a part program operating together with other parts on the same unit, or a program component operating on different unit, and a process represents a collection of operations for achieving a certain outcome.

The flowchart and block diagrams illustrate an architecture, a functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated operations may occur in deferent order or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the disclosed subject matter. While certain embodiments of the disclosed subject matter have been illustrated and described, it will be clear that the invention is not limited to the embodiments described herein. Numerous modifications, changes, variations, substitutions and equivalents are not precluded.

The invention claimed is:

1. A system for event handling in a multi-platform system, comprising:
   a process installed in platforms of the multi-platform system for intercepting events of file access in the multi-platform system generated in the multi-platform system with data thereof, the process is configured to condense the data of the events by encoding the data of the events in codes smaller then the respective coded data and for aggregation events having similar data therebetween therby discarding redundant data of the events, thus avoiding replications of similar data of the events; and
   an at least one server connected to an at least one platform of the multi-platform system,
   the at least one server configured for acquiring the events intercepted by the process and acquiring auxiliary data disparate of the events that is separately provided, for processing the events by an at least one rule while taking into account the auxiliary data for deciding an action affecting the operation of the multi-platform system responsive to the event.

2. The system for event handling in a multi-platform system according to claim 1, wherein the auxiliary data comprises at least one of: a preset data related to the multi-platform system, a data accumulated responsive to the operation of the multi-platform system, or an updated data responsive to the operation of the multi-platform system, or any combination thereof.

3. The system for event handling in a multi-platform system according to claim 1, wherein the auxiliary data is stored in a database connected to the at least one server.

4. The system for event handling in a multi-platform system according to claim 3, wherein the database is stored on an at least one apparatus separate from the at least one server and separate from the multi-platform system.

5. The system for event handling, in a multi-platform system according to claim 1, wherein the at least one server is configured to at least one of: acquire the events in a condensed form, process the events in a condensed form, store the events in a condensed form, or any combination thereof, thereby facilitating real-time response to the events.

6. The system for event handling in a multi-platform system according to claim 5, wherein the condensed form comprises at least one of: a coded event data, or an aggregated event data, or a combination thereof.

7. The system for event handling in a multi-platform system according to claim 1, wherein the at least one rule is stored in the at least one server.

8. The system for event handling in a multi-platform system according, to claim 1, wherein the at least one server is configured to initiate the action decided by the at least one rule.

9. The system for event handling in a multi-platform system according to claim 1, wherein the at least one rule comprises a plurality of rules.

10. The system for event handling in a multi-platform system according to claim 1, wherein the at least one platform comprises a plurality of platforms.

11. The system for event handling in a multi-platform system according to claim 1, wherein the at least one server comprises a plurality of platforms.

12. The system for event handling in a multi-platform system according to claim 1, wherein the process is installed in platforms of the multi-platform system that have accessible files.

13. The system for event handling in a multi-platform system according to claim 1, wherein the action affecting the operation of the multi-platform system comprises an action affecting an outcome of a file access in the multi-platform system.

14. A method for event handling in a multi-platform system, comprising:
   acquiring from the multi-platform system events with data thereof of a file access;
   condensing the data of the events by encoding each event by a code that uniquely represents at least a part the data of each event, so that events having different respective parts of data are encoded by different codes smaller than the respective coded data, and by aggregation of events having similar data therebetween thereby discarding redundant data of the events, thus avoiding replications of similar data of the events;

processing the events while taking into account auxiliary data disparate of the events, that is provided separately from the events, to decide an action affecting the operation of the multi-platform system; and activating the action.

15. The method for event handling in a multi-platform system according to claim 14, wherein processing the event comprises using an at least one rule.

16. The method for event handling in a multi-platform system according to claim 15, wherein the at least one rule comprises a plurality of rules.

17. The method for event handling in a in multi-platform system according to claim 14, wherein the auxiliary data comprises at least one of: a preset data related to the multi-platform system, a data accumulated responsive to the operation of the multi-platform system, or an updated data responsive to the operation of the multi-platform system, or any combination thereof.

18. The method for event handling in a multiplatform system according to claim 14, wherein acquiring an event is carried out on an at least one server connected to and separate from the multi-platform system.

19. The method for event handling in a multi-platform system according to claim 18, wherein the at least one server is configured to at least one of: acquire the events in a condensed form, process the events in a condensed form, store the events in a condensed form, or any combination thereof, thereby facilitating real-time response to the events.

20. The method for event handling in a multi-platform system according to claim 19, wherein the condensed form comprises at least one of: a coded event data, or an aggregated event data, or a combination thereof.

21. The method for event handling in a multi-platform system according to claim 18, wherein the auxiliary data is stored in a database connected to the at least one server.

22. The method for event handling in a multi-platform system according to claim 14, wherein the action affecting the operation of the multi-platform system comprises an action affecting an outcome of a file access in the multi-platform system.

* * * * *